Figure 1:
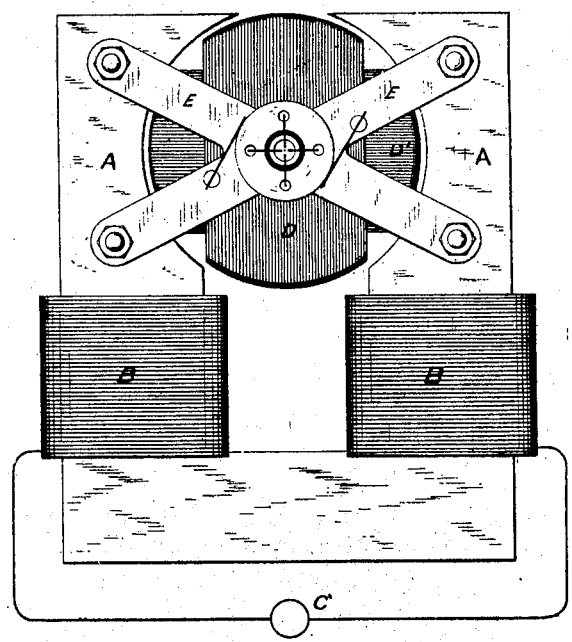

(No Model.)　　　　　　　　　　　　　　　　2 Sheets—Sheet 1.
N. TESLA.
ELECTRICAL TRANSMISSION OF POWER.

No. 382,281.　　　　　　　　　Patented May 1, 1888.

WITNESSES:
Raphael Netter
Henry F. Newbury

INVENTOR
Nikola Tesla.
BY Duncan,
Curtis & Page.
ATTORNEYS.

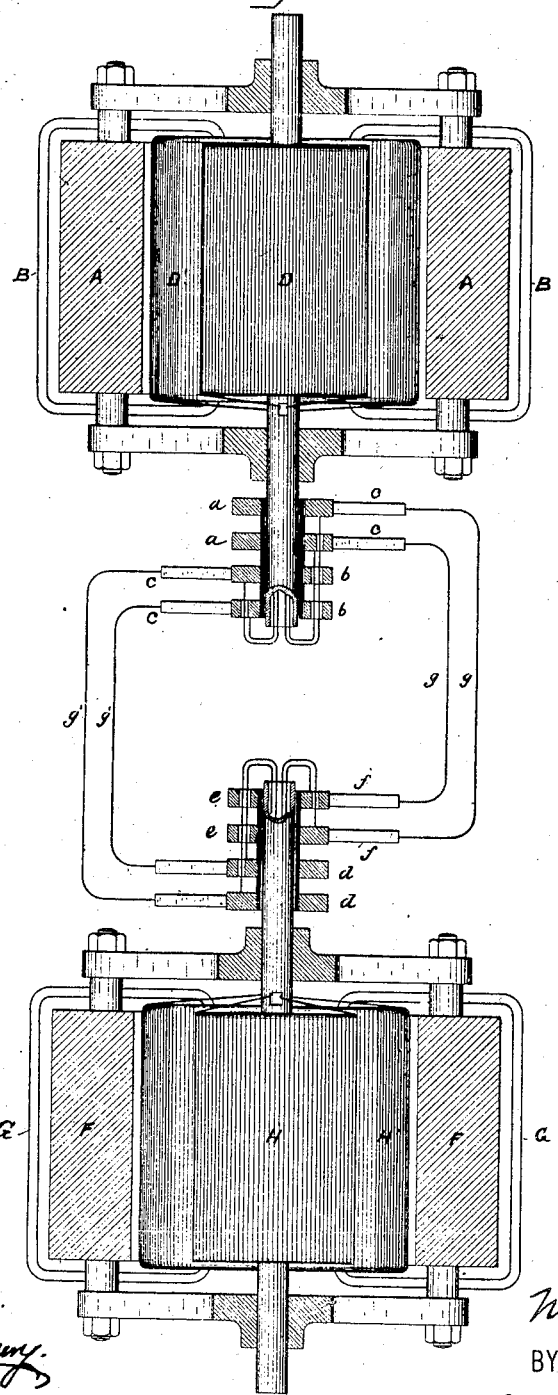

UNITED STATES PATENT OFFICE.

NIKOLA TESLA, OF NEW YORK, N. Y.

ELECTRICAL TRANSMISSION OF POWER.

SPECIFICATION forming part of Letters Patent No. 382,281, dated May 1, 1888.

Original application filed November 30, 1887, Serial No. 256,562. Divided and this application filed March 9, 1888. Serial No 266,756. (No model.)

*To all whom it may concern:*

Be it known that I, NIKOLA TESLA, from Smiljan, Lika, border country of Austria-Hungary, and residing in the city, county, and State of New York, have invented certain new and useful Improvements in the Electric Transmission of Power, of which the following is a specification, this application being a division of an application filed by me November 30, 1887, Serial No. 256,562.

In a previous application filed by me—viz., No. 252,132, filed October 12, 1887—I have set forth an improvement in motors and in the mode or method of operating the same, which, generally stated, consists in progressively and continuously shifting the poles or lines of maximum magnetic effect of either the field-magnets or armature, or both, of a motor, and thereby producing a movement of rotation in the motor. The means which I have shown for effecting this, while varying in detail, are exemplified in the following system, which, for present purposes, it will be sufficient to consider as a typical embodiment of the invention.

The motor is wound with coils forming independent energizing-circuits on the armature, which is a cylinder or disk mounted to rotate between two opposite magnetic poles. These coils are connected up with corresponding induced or current-producing circuits in an alternating-current generator. As a result of this, when the generator is set in motion, currents of alternately-opposite direction are directed through the energizing-coils of the motor in such manner as to produce a progressive shifting or rotation of the magnetic poles of the motor-armature. This movement of the poles of the armature obviously tends to rotate the armature in the opposite direction to that in which the movement of the poles takes place, owing to the attractive force between said poles and the field-magnets, and the speed of rotation increases from the start until it equals that of the generator, supposing both motor and generator to be alike.

As the magnetic poles of the armature are shifted in a direction opposite to that in which the armature rotates, it will be apparent that when the normal speed is attained the poles of the armature will assume a fixed position relatively to the field-magnets, and that in consequence the field-magnets will be energized by magnetic induction, exhibiting two distinct poles, one on each of the pole-pieces. In starting the motor, however, the speed of the armature being comparatively slow, the pole-pieces are subjected to rapid reversals of magnetic polarity; but as the speed increases these reversals become less and less frequent and finally cease, when the movement of the armature becomes synchronous with that of the generator. This being the case, the field-cores or the pole-pieces of the motor become a magnet, but by induction only.

I have found that advantageous results are secured by winding the field-magnets with a coil or coils and passing a continuous current through them, thus maintaining a permanent field, and in this feature my present invention consists.

I shall now describe the apparatus which I have devised for carrying out this invention and explain the mode of using or operating the same.

Figure 2:
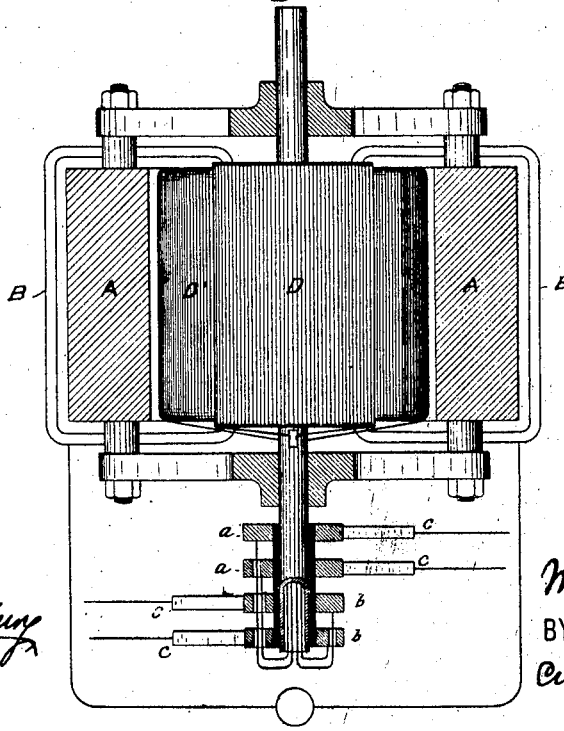

Figure 1 is an end view in elevation of my improved motor. Fig. 2 is a part horizontal central section, and Fig. 3 is a diagrammatic representation of the motor and generator combined and connected for operation.

Let A A in Fig. 1 represent the legs or pole-pieces of a field-magnet, around which are coils B B, included in the circuit of a continuous-current generator, C, which is adapted to impart magnetism to the said poles in the ordinary manner.

D D' are two independent coils wound upon a suitable cylindrical or equivalent armature-core, which, like all others used in a similar manner, should be split or divided up into alternate magnetic and insulating parts in the usual way. This armature is mounted in non-magnetic cross-bars E E, secured to the poles of the field-magnet. The terminals of the armature-coils D D' are connected to insulated sliding contact-rings *a a b b*, carried by the armature-shaft, and brushes *c c* bear upon these rings to convey to the coils the currents which operate the motor.

The generator for operating this motor is or may be of precisely identical construction, and for convenience of reference I have marked in Fig. 3 its parts, as follows: F F, the field-magnets energized by a continuous current passing in its field-coils G G; H H', the coils carried by the cylindrical armature; d d e e, the friction or collecting rings carried by the armature-shaft and forming the terminals of the armature-coils; and f f the collecting-brushes which deliver the currents developed in the armature-coils to the two circuits g g', which connect the generator with the motor.

The operation of this system will be understood from the foregoing. The action of the generator by causing a progressive shifting of the poles in the motor-armature sets up in the latter a rotation opposite in direction to that in which the poles move. If, now, the continuous current be directed through the field-coils so as to strongly energize the magnet A A, the speed of the motor, which depends upon that of the generator, will not be increased, but the power which produces its rotation will be increased in proportion to the energy supplied through the coils B B. It is characteristic of this motor that its direction of rotation is not reversed by reversing the direction of the current through its field-coils, for the direction of rotation depends not upon the polarity of the field, but upon the direction in which the poles of the armature are shifted. To reverse the motor the connections of either of the circuits g g' must be reversed.

I have found that if the field-magnet of the motor be strongly energized by its coils B B, and the circuits through the armature-coils closed, assuming the generator to be running at a certain speed, the motor will not start; but if the field be but slightly energized, or in general in such condition that the magnetic influence of the armature preponderates in determining its magnetic condition, the motor will start, and with sufficient current will reach its maximum or normal speed. For this reason it is desirable to keep at the start, and until the motor has attained its normal speed, or nearly so, the field-circuit open, or to permit but little current to pass through it. I have found, however, if the fields of both the generator and motor be strongly energized that starting the generator starts the motor, and that the speed of the motor is increased in synchronism with the generator.

Motors constructed and operated on this principle maintain almost absolutely the same speed for all loads within their normal working limits, and in practice I have observed that if the motor be overloaded to such an extent as to check its speed the speed of the generator, if its motive power be not too great, is diminished synchronously with that of the motor.

I have in other applications shown how the construction of these or similar motors may be varied in certain well-known ways—as, for instance, by rotating the field about a stationary armature or rotating conductors within the field—but I do not illustrate these features further herein, as with the illustration which I have given I regard the rest as within the power of a person skilled in the art to construct.

I am aware that a device embodying the characteristics of a motor and having a permanently-magnetized field-magnet has been operated by passing through independent coils on its armature a direct or continuous current in opposite directions. Such a system, however, I do not regard as capable of the practical applications for which my invention is designed, nor is it the same in principle or mode of operation, mainly in that the shifting of the poles is intermittent and not continuous, and that there is necessarily involved a waste of energy.

In my present application I do not limit myself to any special form of motor, nor of the means for producing the alternating currents as distinguished from what are called "reversed currents," and I may excite or energize the field of the motor and of the generator by any source of current which will produce the desired result.

What I claim is—

The method herein described of transmitting power by electro-magnetic motors, which consists in continuously and progressively shifting the poles of one element of the motor by alternating currents and magnetizing the other element by a direct or continuous current, as set forth.

NIKOLA TESLA.

Witnesses:
 FRANK B. MURPHY,
 FRANK E. HARTLEY.